(12) United States Patent
Carter et al.

(10) Patent No.: US 6,799,112 B1
(45) Date of Patent: Sep. 28, 2004

(54) METHODS AND APPARATUS FOR OPERATING GAS TURBINE ENGINES

(75) Inventors: Bruce Alan Carter, West Chester, OH (US); Mark Anil Patel, Cincinnati, OH (US); Louis Charles Stokley, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/678,919

(22) Filed: Oct. 3, 2003

(51) Int. Cl.[7] .............................................. G06F 19/00
(52) U.S. Cl. ...................... 701/100; 184/6.11; 60/39.01
(58) Field of Search .................. 701/100, 36; 60/39.01, 60/39.08, 805; 415/110; 184/6.13, 6.11, 6.4

(56) References Cited

U.S. PATENT DOCUMENTS

| | | | | |
|---|---|---|---|---|
| 5,033,010 A | * | 7/1991 | Lawrence et al. | ............ 701/35 |
| 5,082,208 A | * | 1/1992 | Matich | ......................... 244/78 |
| 5,429,208 A | * | 7/1995 | Largillier et al. | .......... 184/6.11 |
| 5,485,717 A | * | 1/1996 | Williams | ...................... 60/773 |
| 5,611,661 A | * | 3/1997 | Jenkinson | .................... 415/112 |
| 5,619,850 A | | 4/1997 | Palmer et al. | |
| 6,470,666 B1 | | 10/2002 | Przytulski et al. | |

* cited by examiner

Primary Examiner—Richard Camby
(74) Attorney, Agent, or Firm—William Scott Andes; Armstrong Teasdale LLP

(57) ABSTRACT

A method is provided for detecting airflow reversal in a sump system of a gas turbine engine. The method includes positioning a first pressure sensor at a sump vent to sense a discharge flow pressure from a sump within the sump system, positioning a second pressure sensor in the sump to sense a pressure in the sump, comparing the sensed pressures obtained from the first and second pressure sensors to determine a pressure difference, and comparing the pressure difference to a predetermined maximum allowable pressure difference.

18 Claims, 3 Drawing Sheets

US 6,799,112 B1

METHODS AND APPARATUS FOR OPERATING GAS TURBINE ENGINES

BACKGROUND OF THE INVENTION

This invention relates generally to gas turbine engines, and more specifically to a method and apparatus for detecting airflow reversal in a sump system.

At least some known gas turbine engines include at least one bearing assembly that rotatably supports a shaft. The bearing assembly is lubricated with oil, which also absorbs and dissipates heat from the bearing and other engine components. Bearing assemblies are housed within sumps that include a supply pump that supplies lubricating oil under pressure to the bearing assemblies, and a scavenge pump that removes spent oil from the sump. Seal assemblies facilitate minimizing oil leakage from the sump along the rotor shaft.

To further facilitate reducing oil leakage from the sump, at least some known bearing assembly sumps are located within pressurized cavities that include seals that extend around the rotor shaft. During operation, compressed air is supplied to pressurize the sump cavity. The sump is also vented to allow continuous air flow through the sump and to prevent oil leakage from sump seals. In at least some known engines, vent pressure is monitored at a vent exit downstream from the sump. However, if the vent air flow becomes inhibited, pressure increases in the sump may go undetected until an over-pressurization condition occurs that is sufficient to cause flow reversal across a sump seal. With either of these conditions, oil can leak out and accumulate in the rotor system causing sub-synchronous vibrations which can result in severe engine damage.

BRIEF DESCRIPTION OF THE INVENTION

In one aspect, a method is provided for detecting airflow reversal in a sump system of a gas turbine engine. The method includes positioning a first pressure sensor at a sump vent to sense a discharge flow pressure from a sump within the sump system, positioning a second pressure sensor in the sump to sense a pressure in the sump, comparing the sensed pressures obtained from the first and second pressure sensors to determine a pressure difference, and comparing the pressure difference to a predetermined maximum allowable pressure difference.

In another aspect, an apparatus for detecting sump airflow reversal in a vented sump in a gas turbine engine is provided. The apparatus includes a first pressure sensor coupled in flow communication with a sump vent for sensing a sump pressure at the sump vent. The first pressure sensor is configured to produce a first signal indicative of the sensed pressure. A second pressure sensor is positioned within the sump for sensing a sump pressure therein. The second pressure sensor is configured to produce a second signal indicative of the sensed pressure. An output device is coupled to the first and second pressure sensors and is configured to receive and display pressure indications based on the first and second signals.

In another aspect, a gas turbine engine is provided that includes a compressor, a turbine, a shaft assembly coupling the compressor and the turbine, and a support assembly rotatably supporting said shaft assembly. A sump system for collecting oil from the support assembly includes a detection system for detecting operating pressures in the sump system. An engine monitoring system is coupled to the detection system for detecting air flow reversal in the sump system.

DETAILED DESCRIPTION OF THE INVENTION

Figure 1:
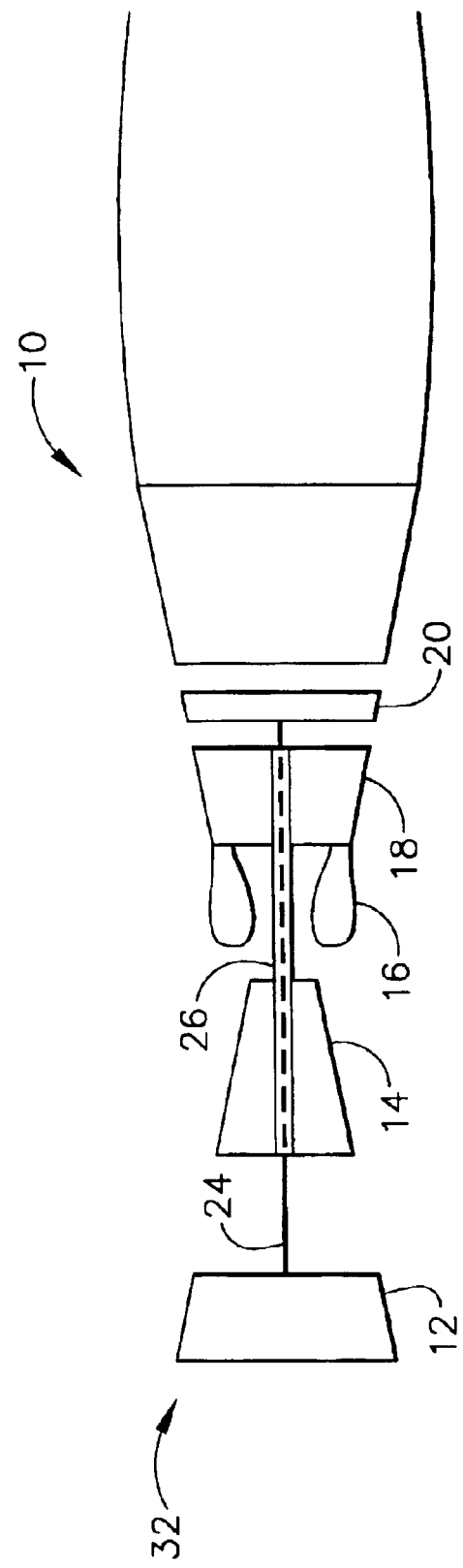
FIG. 1 is a schematic illustration of an exemplary gas turbine engine.

FIG. 1 is a schematic illustration of a gas turbine engine 10 including a low pressure (LP) compressor 12, a high pressure (HP) compressor 14, and a combustor assembly 16. Engine 10 also includes a high pressure (HP) turbine 18, and a low pressure (LP) turbine 20 arranged in a serial, axial flow relationship. LP compressor 12 and LP turbine 20 are coupled by a first, or LP, shaft 24, and compressor 14 and turbine 18 are coupled by a second, or HP, shaft 26. In one embodiment, engine 10 is an GE90 engine commercially available from General Electric Company, Cincinnati, Ohio.

In operation, air flows through low pressure compressor 12 from an upstream side 32 of engine 10 and compressed air is supplied from low pressure compressor 12 through core duct 13 to high pressure compressor 14. Compressed air is then delivered to combustor assembly 16 where it is mixed with fuel and ignited. The combustion gases are channeled from combustor 16 to drive HP and LP turbines 18 and 20 respectively. LP compressor 12 is in turn driven by LP turbine 20 via LP shaft 24. Similarly, HP compressor 14 is driven by HP turbine 18 via HP shaft 26.

Figure 2:
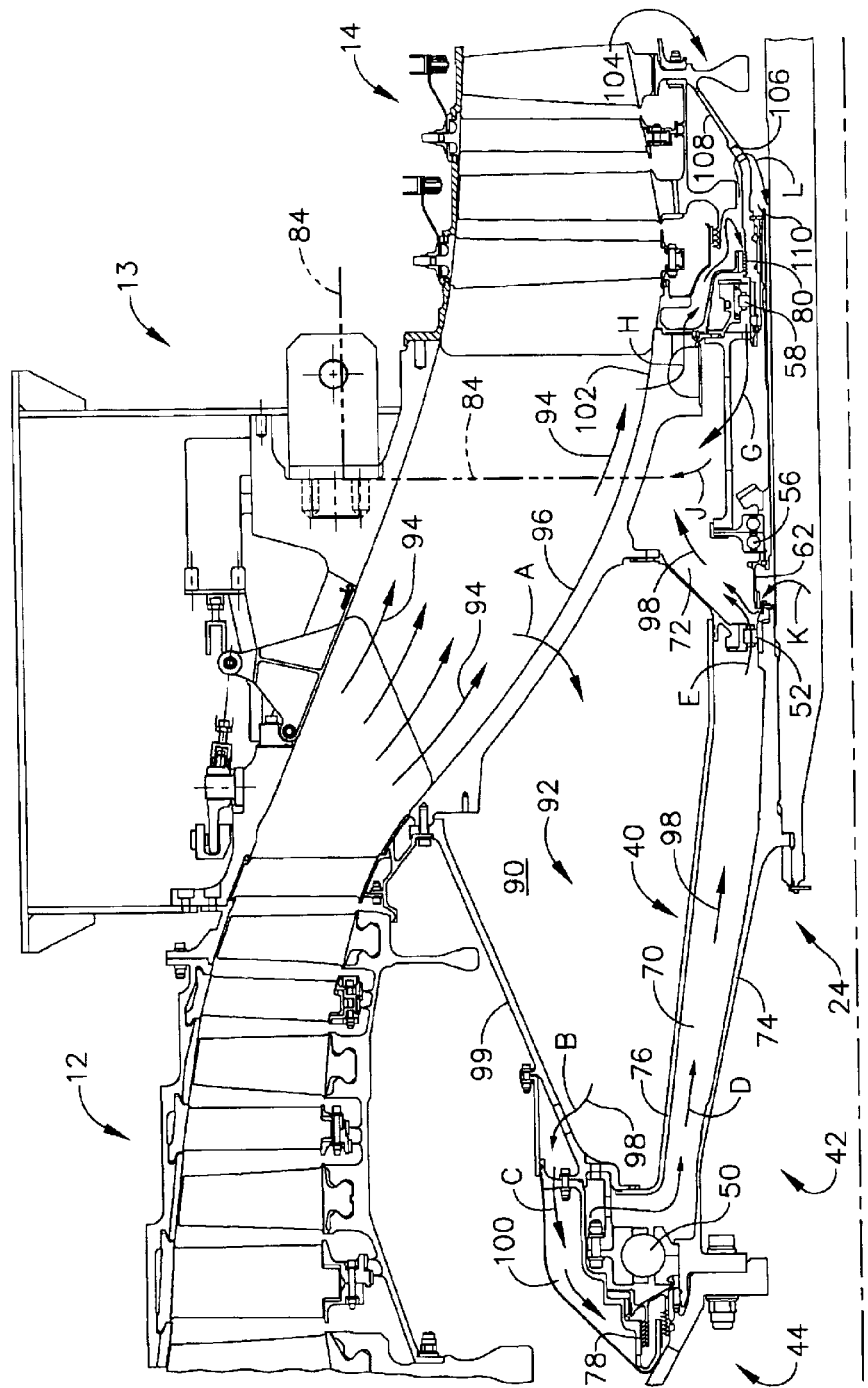
FIG. 2 is a cross-sectional view of a sump system used with the gas turbine engine shown in FIG. 1.

FIG. 2 is a cross-sectional view of a sump system 40 used with the gas turbine engine of FIG. 1. LP compressor 12 and HP compressor 14 are interconnected by a transition duct, or core duct 13 that includes sump system 40. LP shaft 24 and HP shaft 26 are supported by a bearing support system 42 that includes, at an upstream end 44, a front LP shaft bearing 50. A second LP shaft bearing 52 is located downstream from front bearing 50. HP shaft 26 is supported at an upstream end by a third bearing 56 and a fourth bearing 58. In the exemplary embodiment, third bearing 56 is a duplex bearing that is a part of an intermediate gear box housing (not shown).

Sump system 40 extends from front bearing 50 to fourth bearing 58, and encompasses bearings 52 and 56, and a spanner nut seal 62 that extends between bearings 52 and 56. Sump system 40 comprises an upstream cavity 70, a downstream cavity 72, and an accessory gearbox (AGB) passageway (not shown). A rotating portion 74 of LP shaft 24 defines an inner wall of upstream sump cavity 70. A stationary cone 76 defines an outer wall of upstream cavity 70 that, along with air and oil seals 78 and 80, and spanner nut seal 62, provide containment for sump system 40. Upstream cavity 70, downstream cavity 72 and the AGB passageway are all in flow communication with each other and define a contained volume that is vented to the atmosphere through a vent system 84. An air cavity 90 is a part of a pressurization air circuit 92 that provides venting air flow to sump system 40.

Sump system 40 is an oil collection system such that cavities 70 and 72 and the AGB passageway are located within oil wetted areas. Sump system 40 is pressurized to facilitate minimizing oil leakage and is vented using vent system 84 to facilitate preventing over-pressurization. Pressure in sump system 40 may increase if vent system 84 becomes obstructed.

In pressurizing and venting sump system 40, gas path air 94 enters pressurization air circuit 92 at cavity 90 through holes (not shown) defined in a duct wall 96 in a direction represented by arrow A. Pressurization air 98 subsequently flows from cavity 90 through structural member 99 and into chamber 100 as indicated by arrows B and C. Pressurization air 98 then flows across seal teeth (not shown) at a seal 78 adjacent bearing 50 and into cavity 70 in the direction of arrow D and is channeled towards bearing 52 as indicated by arrow E. Pressurization air 98 flows across bearing 52 into cavity 72 whereupon the air 98 exits sump system 40 via vent system 84.

Pressurization air 98 also enters sump system 40 from HP compressor side at bearing 58. A portion 102 of duct wall 96 has additional holes (not shown) wherein gas path air 94 enters as indicated by arrow H. Pressurization air 98 then flows across seal 80, around bearing 58, and into cavity 72 in the direction of arrow G, after which air exits sump system 40 via vent system 84 as indicated by arrow J. Pressurization air 98 also flows through holes 106 in HP compressor rotor 108 as indicated by arrow L to enter a cavity 110 that extends forwardly to bearing 56 and spanner nut seal 62.

A third source of pressurization air 98 is provided at spanner nut seal 62. Pressurization air crosses spanner nut seal 62 as indicated by arrow K to enter cavity 72, and exits cavity 82 as described above, via vent system 84. Maintaining venting airflow through sump system 40, as described above, facilitates preventing oil leakage into unwanted areas such as, but not limited to, a compressor cavity 104.

Air pressure within sump system 40 may increase if too much air comes into sump system 40 and/or if air is not vented from sump system 40 fast enough. Additionally, this condition may occur if vent system 84 becomes restricted. If the pressure within sump system 40 becomes excessive, and the condition goes undetected, a failure of one or more of seals 62, 78, 80 may ultimately occur. The failure will typically occur at the seal 62, 78, or 80 which operates with the smallest pressure drop across the seal, and/or at the seal having the smallest diameter. By way of illustration only, within engine 10, spanner nut seal 62 is one of the seals having a smaller diameter and could be susceptible to failure from over-pressurization. When seal failure occurs, air flow across the failed seal reverses, that is, oil entrained air escapes from sump system 40 across the failed seal rather than venting air flowing into sump system 40 across the seal. Early detection of such seal failures facilitates the avoidance of damage to engine 10.

Figure 3:
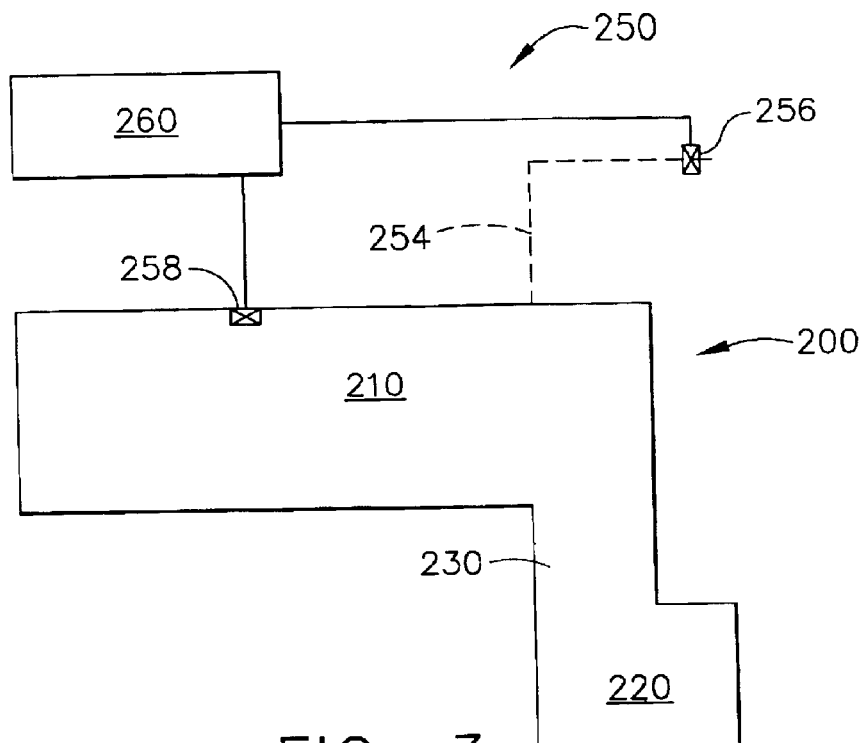
FIG. 3 is a schematic illustration of an exemplary sump air flow detection system that may be used with the sump system in FIG. 2.
Figure 4:
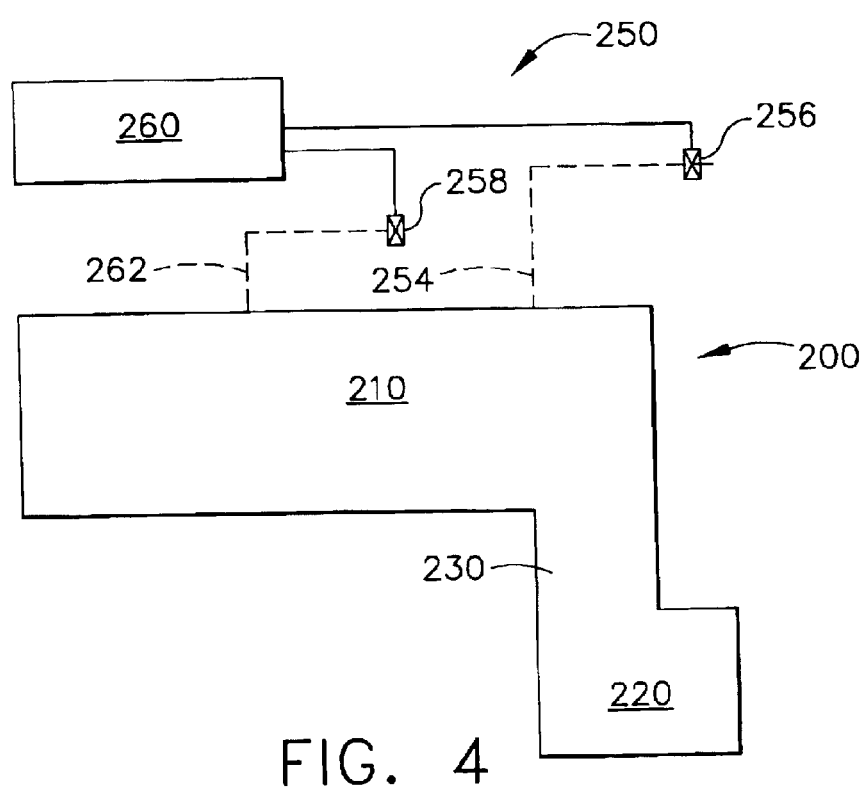
FIG. 4 is a schematic illustration of an alternative embodiment of a sump air flow detection system that may be used with the sump system in FIG. 2.

FIG. 3 is a schematic illustration of an exemplary embodiment of a sump airflow reversal detection system that may be used with engine 10. FIG. 4 is a schematic illustration of an alternative embodiment of a sump airflow reversal detection system that may be used with engine 10. Sump system 200 includes a main cavity 210 and an accessory cavity 220. Main cavity 210 includes two or more distinct areas (not shown) that are separated by bearings and seals (not shown), but are in flow communication with each other. Accessory cavity 220 is in flow communication with sump main cavity 210 via a passageway 230. In one embodiment, accessory cavity 220 houses a gearbox (not shown). Alternatively, accessory cavity 220 may comprise a series of ports (not shown) for sensing and monitoring various engine operating conditions, such as, but not limited to, engine speed.

Detection system 250 is used for detecting sump air flow reversal is coupled to sump system 200. Detection system 250 includes a sump vent 254, a first pressure sensor 256 coupled to vent 254, and a second pressure sensor 258 positioned within main cavity 210. A control unit 260 receives pressure signals from sensors 256 and 258. First pressure sensor 256 in vent 254 senses pressure in vent 254. Second pressure sensor 258 is positioned to sense pressure in sump system 200.

Sump system 200 is an oil-wetted environment and sensor 258 can be placed at substantially any location within sump system 200. In one embodiment, sensor 258 is positioned directly within main cavity 210. Alternatively, sensor 258 is positioned in accessory cavity 220, either directly within cavity 220 or at a sensing port, if provided. In another embodiment, sensor 258 is coupled to sump system 200 via a pressure line from sump system 200. However, the pressure line should be purged with air prior to sensing the pressure to ensure an accurate reading. In yet another embodiment, sump system 200 may be provided with a second sump vent 262 with sensor 258 sensing a pressure in vent 262.

In operation, air flow through sump system 200 is controlled through pressurization and venting of sump system 200. Air enters sump 200 across bearings and seals (not shown in FIG. 4) as previously described. Vent system 254 vents sump system 200 to facilitate avoiding damage to seals due to excessive pressures. If vent 254 becomes restricted, over-pressurization in sump 200 may occur.

Pressure signals from sensors 256 and 258 are transmitted to control unit 260 wherein the signals are compared. When vent 254 is unrestricted, the pressure readings from sensors 256 and 258 will be the same. However, if a restriction is present in vent 254, sensor 258 will indicate a higher pressure than sensor 256. Accordingly, when a pressure difference occurs, the pressure difference is monitored and compared to a maximum allowable value. The maximum allowable value is predetermined and represents a maximum pressure difference that the seals can withstand without failure resulting in air flow reversal, allowing oil to escape sump system 200.

Control unit 260 receives pressure signals from sensors 256 and 258. Control unit 260 can be programmed to display either the individual pressure signal values, or a difference value. In one embodiment, control unit 260 is a part of an engine monitoring system that includes software configured to determine a pressure difference based on the pressure signals from sensors 256 and 258 and display the pressure difference.

The above described monitoring apparatus and method provide a cost effective and highly reliable apparatus for detecting air flow reversal in a sump system. By setting appropriate limits for the pressure differential, the apparatus can sense an overpressure condition in the sump and alert an engine operator to a seal deterioration problem before significant secondary engine damage occurs, thus alleviating the cost of extensive engine repair.

Exemplary embodiments of an apparatus for monitoring airflow reversal in a sump system are described above in detail. The sump air flow reversal detection apparatus is not limited to the specific embodiments described herein, but rather each component may be utilized independently and separately from other components described herein. Each component can also be used in combination with other sump monitoring systems.

While the invention has been described in terms of various specific embodiments, those skilled in the art will recognize that the invention can be practiced with modification within the spirit and scope of the claims.

What is claimed is:

1. A method for detecting airflow reversal in a sump system of a gas turbine engine, said method comprising:

positioning a first pressure sensor at a sump vent to sense a discharge flow pressure from a sump within the sump system;

positioning a second pressure sensor in the sump to sense a pressure in the sump;

comparing the sensed pressures obtained from the first and second pressure sensors to determine a pressure difference; and comparing the pressure difference to a predetermined maximum allowable pressure difference.

2. A method in accordance with claim 1 wherein positioning a second pressure sensor in the sump comprises positioning a second pressure sensor in an oil-wetted environment.

3. A method in accordance with claim 1 wherein positioning a second pressure sensor in the sump further comprises sensing the pressure in a pressure line.

4. A method in accordance with claim 3 wherein sensing the pressure through a pressure line further comprises purging the pressure line with air prior to sensing the pressure.

5. A method in accordance with claim 1 wherein positioning a second pressure sensor in the sump comprises positioning a second pressure sensor at a second sump vent.

6. A method in accordance with claim 1 wherein comparing the sensed pressures comprises:

transmitting a pressure signal from each of the first and second pressure sensors to an engine monitoring system;

determining a pressure difference in the monitoring system; and displaying the pressure difference.

7. An apparatus for detecting sump airflow reversal in a vented sump in a gas turbine engine, said apparatus comprising:

a first pressure sensor coupled in flow communication with a sump vent for sensing a sump pressure at said sump vent, said first pressure sensor configured to produce a first signal indicative of the sensed pressure;

a second pressure sensor within said sump for sensing a sump pressure within said sump, said second pressure sensor configured to produce a second signal indicative of the sensed pressure; and an output device coupled to said first and second pressure sensors, said output device configured to receive and display pressure indications based on the first and second signals.

8. An apparatus in accordance with claim 7 wherein said second pressure sensor is disposed in an oil-wetted environment.

9. An apparatus in accordance with claim 7 wherein said sump comprises a second sump vent, said second pressure sensor coupled in flow communication with said second sump vent for sensing a sump pressure therethrough.

10. An apparatus in accordance with claim 9 wherein said second sump vent defines a drain path for said sump.

11. An apparatus in accordance with claim 7 wherein said output device is further configured to:

determine a pressure difference between the first and second pressure signals; and display an indication of the pressure difference.

12. An apparatus in accordance with claim 11 wherein said output device is further configured to compare the pressure difference to a predetermined maximum allowable pressure difference.

13. A gas turbine engine comprising:

a compressor;

a turbine;

a shaft assembly coupling said compressor and said turbine;

a support assembly rotatably supporting said shaft assembly;

a sump system for collecting oil from said support assembly, said sump system comprising a detection system for detecting operating pressures in said sump system; and an engine monitoring system coupled to said detection system for detecting air flow reversal in said sump system.

14. An engine in accordance with claim 13 wherein said detection system comprises:

a first pressure sensor coupled in flow communication with a sump vent for sensing a sump pressure at said sump vent, said first pressure sensor configured to produce a first signal indicative of the sensed pressure;

a second pressure sensor within said sump for sensing a sump pressure within said sump, said second pressure sensor configured to produce a second signal indicative of the sensed pressure; and said monitoring system is configured to receive the first and second signals from said first and second pressure sensors.

15. An engine in accordance with claim 14 wherein said monitoring system is further configured to determine a pressure difference based on the first and second signals.

16. An engine in accordance with claim 14 wherein said second pressure sensor is positioned in an oil-wetted environment.

17. An engine in accordance with claim 14 wherein said sump includes a second vent, said second pressure sensor in flow communication with said second vent for sensing a sump pressure therethrough.

18. An engine in accordance with claim 14 wherein said second vent defines a drain path for said sump.

* * * * *